United States Patent [19]

Nelson

[11] Patent Number: 5,227,782
[45] Date of Patent: Jul. 13, 1993

[54] HYDROSTATIC INTERFACE UNIT
[75] Inventor: Richard L. Nelson, Chanhassen, Minn.
[73] Assignee: Rosemount Inc., Eden Prairie, Minn.
[21] Appl. No.: 744,893
[22] Filed: Aug. 14, 1991
[51] Int. Cl.⁵ .............................................. G08C 19/04
[52] U.S. Cl. ............................. 340/870.11; 307/315; 307/98; 361/18; 323/293; 323/352
[58] Field of Search ................... 307/98, 315; 361/18; 323/352-354, 293, 369, 370; 340/870.14, 870.11; 73/299; 364/509

[56] References Cited
U.S. PATENT DOCUMENTS
4,497,033 1/1985 Hernandez et al. ............ 364/509 X
4,988,990 1/1991 Warrior ........................... 340/825.06

Primary Examiner—Donald J. Yusko
Assistant Examiner—Michael Horabik
Attorney, Agent, or Firm—Kinney & Lange

[57] ABSTRACT

An interface unit is provided for transmitting signals to and receiving signals from several transmitters. The interface unit includes a DC power supply, an active load, and a transmit/receive circuit connected to the first wire of a two wire circuit which transmits signals to and receives signals from the transmitters. The active load is connected in series with the DC power supply between the first and second wire of the two wire circuit and has a first impedance at DC and a second, higher impedance within a frequency range defined by the signals transmitted to and received from the transmitters.

12 Claims, 5 Drawing Sheets

HYDROSTATIC INTERFACE UNIT

BACKGROUND OF THE INVENTION

This invention relates to an apparatus which allows a hydrostatic interface unit (HIU) to detect digital communication signals while minimizing the input power needed by the unit. More particularly, an active load within the hydrostatic interface unit provides a high impedance at AC frequencies for detecting digital communication signals, while providing a low impedance at DC frequencies, minimizing the input power needed for the hydrostatic interface unit.

The hydrostatic interface unit (HIU) is one of a series of instruments utilized in a tank gauging system. In this system, numerous liquid-filled tanks are located on a tank farm. Each tank has various transmitters connected to it. These transmitters are electrically coupled in parallel with one another in a "multidrop" arrangement and provide inputs to an HIU. The HIU accumulates data from various transmitters connected to it and combines their output representing pressure and temperature of the liquid in the tanks to provide a single output which indicates liquid level. The HIU outputs a digital signal to a control room via a translator. The control room monitors the liquid levels of numerous tanks and adjusts indicators, control outputs, or alarms as necessary.

In conventional HIUs, a resistor is used as a load across which communication signals appear and can be detected. In order to provide enough impedance at frequencies for detecting digital communication signals reliably, the resistor would have a minimum of 500 ohms of resistance. This 500 ohm resistor was sufficient for the HIU not adapted for use in so-called "designated field safe areas" where cabling is required to have specified low power levels to meet intrinsic safety requirements.

When a facility (such as a tank farm) uses or produces explosive vapors, special precautions must be taken with electrical circuits in areas of the facility where there are explosive mixtures. These areas are called "designated field safe areas" and are areas where the vapors can reach concentrations which may explode if there is an ignition spark. Also, some sparks have enough energy to ignite an explosive mixture and other sparks do not have enough energy to ignite an explosive mixture. Thus, electrical circuitry which enters "designated field safe areas" must have specified low voltage, low current, and energy storage capacity so that if its wires are inadvertently shorted out and a spark occurs, the spark will not have enough energy to ignite an explosive mixture. The limits have been developed experimentally and are defined in various safety standards. This is the subject of designing for intrinsic safety.

The problem of designing for intrinsic safety is magnified in a multidrop circuit, such as a tank gauging system having several transmitters connected to a single HIU, because the HIU and every transmitter connected to it must be energized within the power limit for one circuit. Small energy losses which normally would be ignored in other designs become extremely important and great efforts are utilized to reduce them. When small energy losses in a multidrop circuit are added together, the resulting amount of energy loss often exceeds the allowable limit for input energy to a HIU.

Thus, there is a need for a HIU with a load which will not only provide high impedances at AC frequencies for detecting digital communication signals, but will also provide low impedances at low frequencies (essentially DC), making intrinsic safety approval possible.

SUMMARY OF THE INVENTION

The interface unit of the present invention transmits signals to and receives signals from a plurality of transmitters. The interface unit includes first and second terminals, transmit/receive circuit means, DC power supply means, and an active load.

The first and second terminals connect the interface unit to the transmitters. The transmit/receive circuit means is connected to the first terminal for transmitting signals to and receiving signals from the transmitters.

The DC power supply means and the active load are connected in series between the first and second terminal. The active load has a first impedance at low frequencies (DC) and a second, higher impedance within a frequency range defined by frequencies of the signals transmitted to and received from the transmitters. The high impedance at AC frequencies allows the interface unit to properly detect digital communication signals from the transmitters, while the smaller impedance at DC allows intrinsic safety approval.

DETAILED DESCRIPTION OF THE PREFERRED EMBODIMENTS

Figure 1:
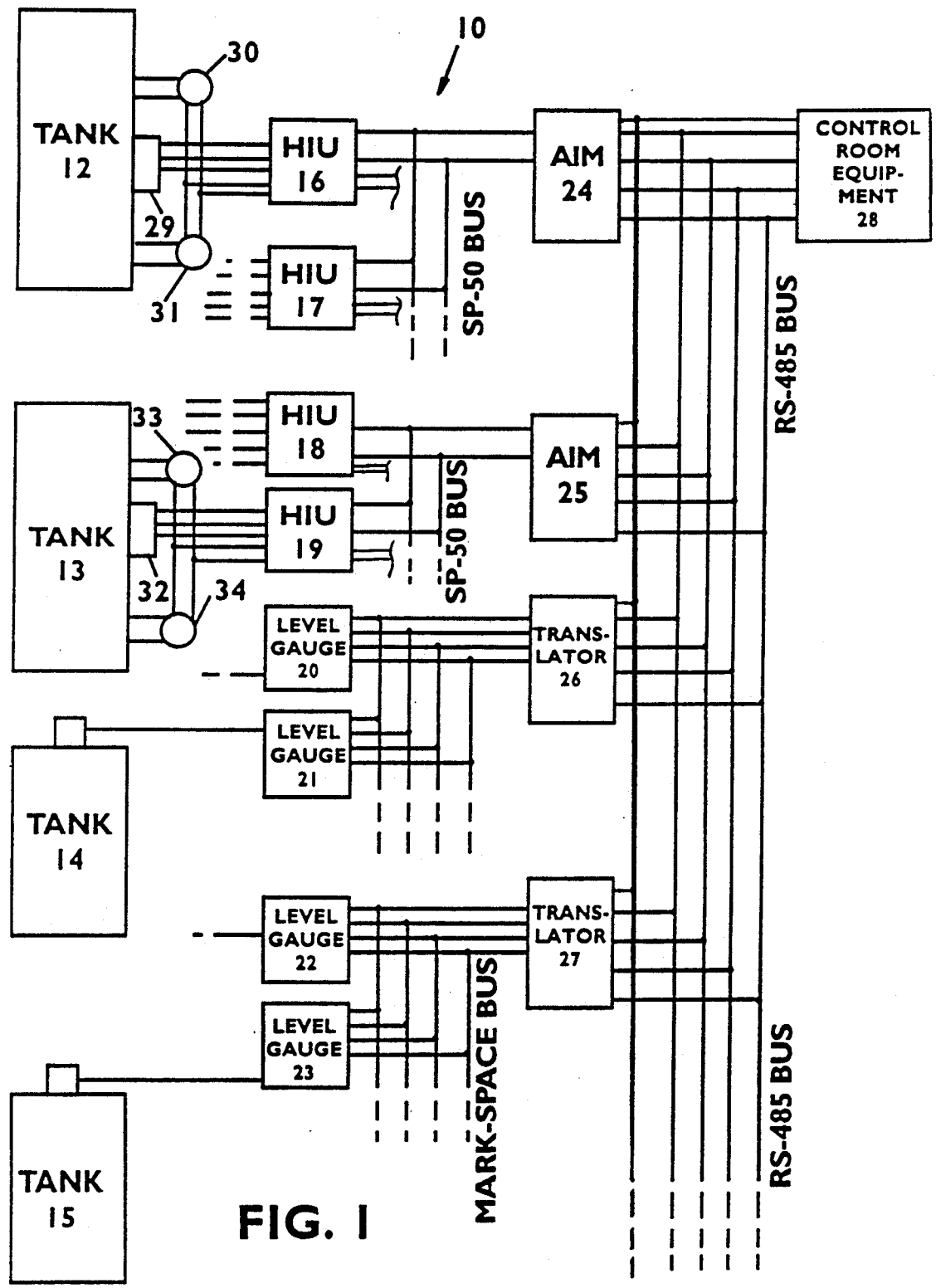
FIG. 1 is a block diagram of a tank gauging system which includes the improved hydrostatic interface unit of the present invention.

FIG. 1 shows one preferred embodiment of a tank gauging system 10. In FIG. 1, a relatively small tank gauging system is depicted with dashed lines indicating additional connections for systems including more tanks and more associated equipment than are shown in FIG. 1. Tank gauging system 10 includes tanks 12, 13, 14, and 15, hydrostatic interface units (HIUs) 16, 17, 18, and 19, level gauges 20, 21, 22, and 23, application interface modules (AIMs) 24 and 25, translators 26 and 27 and control room equipment 28. In this preferred embodiment, tank 12 is fitted with three sensors: RTD temperature sensor 29, middle level pressure transmitter 30, and bottom level pressure transmitter 31. Likewise, tank 13 is fitted with three sensors: RTD temperature sensor 32, middle pressure transmitter 33, and bottom pressure transmitter 34. HIUs 16, 17, 18, and 19 are each connected to the sensors on a tank for receiving the sensor outputs as shown in FIG. 1.

HIUs 16, 17, 18, and 19 transmit tank level information and other parameters over long cables to AIMs 24 and 25 using serial communication such as the SP-50 (draft standard) bus communication. AIMs 24 and 25 receive tank level information from HIUs 16, 17, 18, and 19 and retransmit the information to control equipment 28 via an RS-485 bus as shown in FIG. 1.

Level gauges 20, 21, 22, and 23 sense tank levels in tanks such as tanks 14 and 15 and transmit level information over mark-space busses to translators 26 and 27 as shown in FIG. 1. Translators 26 and 27 translate the level information to an RS-485 format and transmit the information over the RS-485 bus to control room equipment 28.

In addition to carrying information, busses can also carry energization current for the various pieces of equipment.

Figure 2:
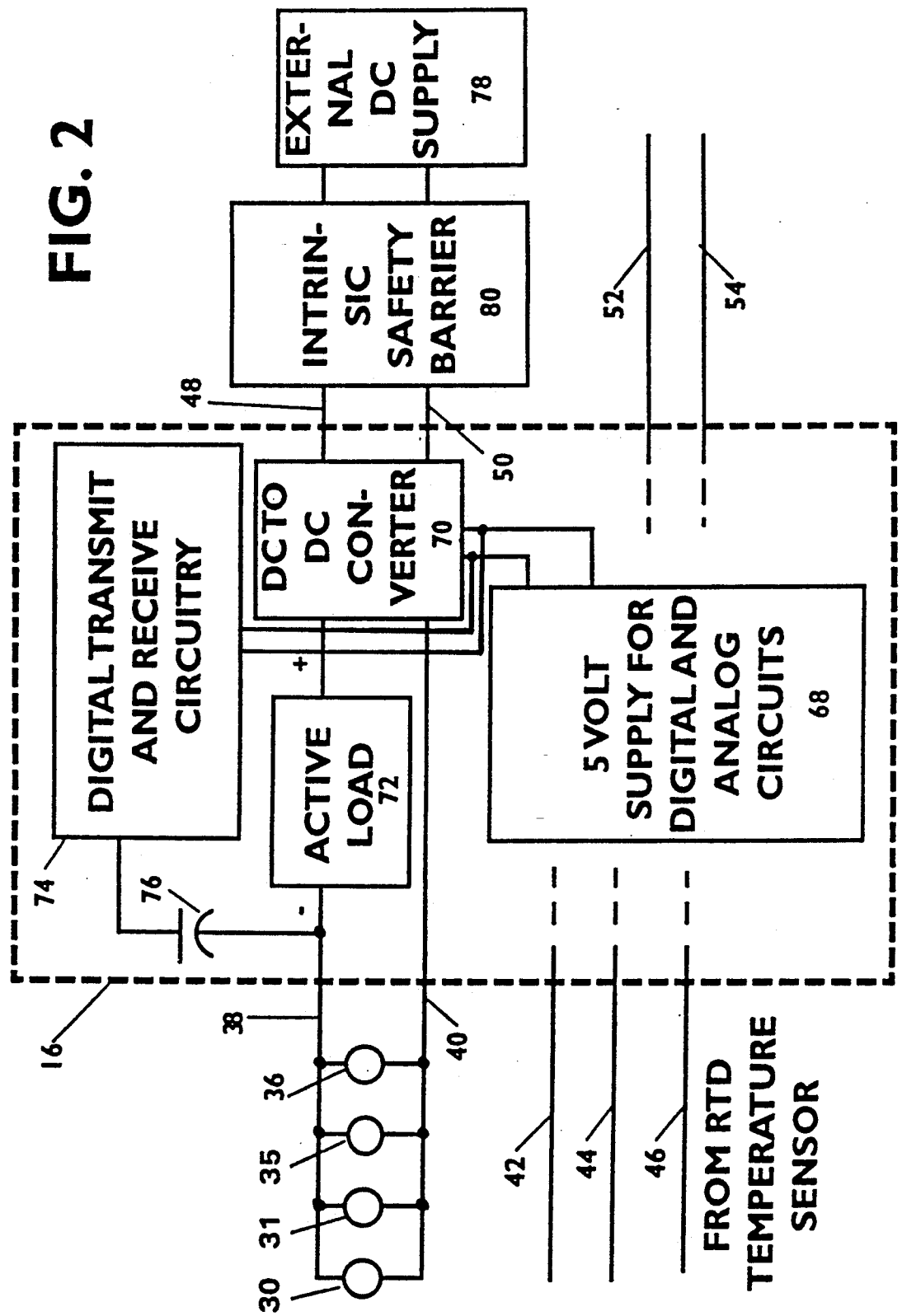
FIG. 2 is a block diagram of a hydrostatic interface unit in accordance with the present invention.

FIG. 2 shows a preferred embodiment of an improved HIU 16 in accordance with the present invention. Middle pressure transmitter 30 and bottom pressure transmitter 31 of tank 12 and additional transmitters 35 and 36, if needed, are electrically coupled in parallel to multidrop bus conductors 38 and 40 in a multidrop arrangement. In the multidrop arrangement, conductors 38 and 40 carry energization current for transmitters 30, 31, 35, and 36 and also carry serial digital communication signals going between HIU 16 and transmitters 30, 31, 35, and 36. The serial digital communication signals are bidirectional and superimposed on the energization current. DC-DC converter 70 in HIU 16 provides the energization current to conductors 38 and 40 through an active load 72. DC-DC converter 70 also energizes a 5 volt supply circuit 68 in HIU 16. The 5 volt supply circuit 68 energizes digital and analog circuitry in the HIU such as digital transmit and receive circuitry 74. Digital transmit and receive circuitry 74 communicates with transmitters 30, 31, 35, and 36 by coupling serial communication signals through capacitor 76. Circuitry in the HIU also energizes RTD temperature sensor 29 via conductors 42 and 46 and senses a temperature signal on line 44.

External DC power supply 78 energizes DC-DC converter 70 via conductors 48 and 50. DC-DC converter 70, in turn, energizes circuitry in HIU 16 and the transmitters on the multidrop bus. Intrinsic safety barrier 80 of conventional construction limits the current and potentials delivered to conductors 48 and 50 to a level which is not capable of generating a spark with enough energy to ignite a flammable mixture.

In order for HIU 16 to properly detect digital communication signals transmitted from transmitters 30, 31, 35, and 36, active load 72 must provide a high impedance of greater than 500 ohms at AC frequencies ranging from approximately 1.2 kilohertz to 2.2 kilohertz, which is the normal frequency range of the digital communication signal. However, because intrinsic barrier 80 limits the voltage and current which energizes HIU 16, active load 72 must also provide a low impedance of under approximately 150 ohms at low frequencies (particularly at DC and low frequency conditions such as the DC energization current provided to the multidrop bus).

HIU 16 can also interface with other circuitry, such as a 4-20 milliamp loop indicated by conductors 52 and 54.

Figure 3:
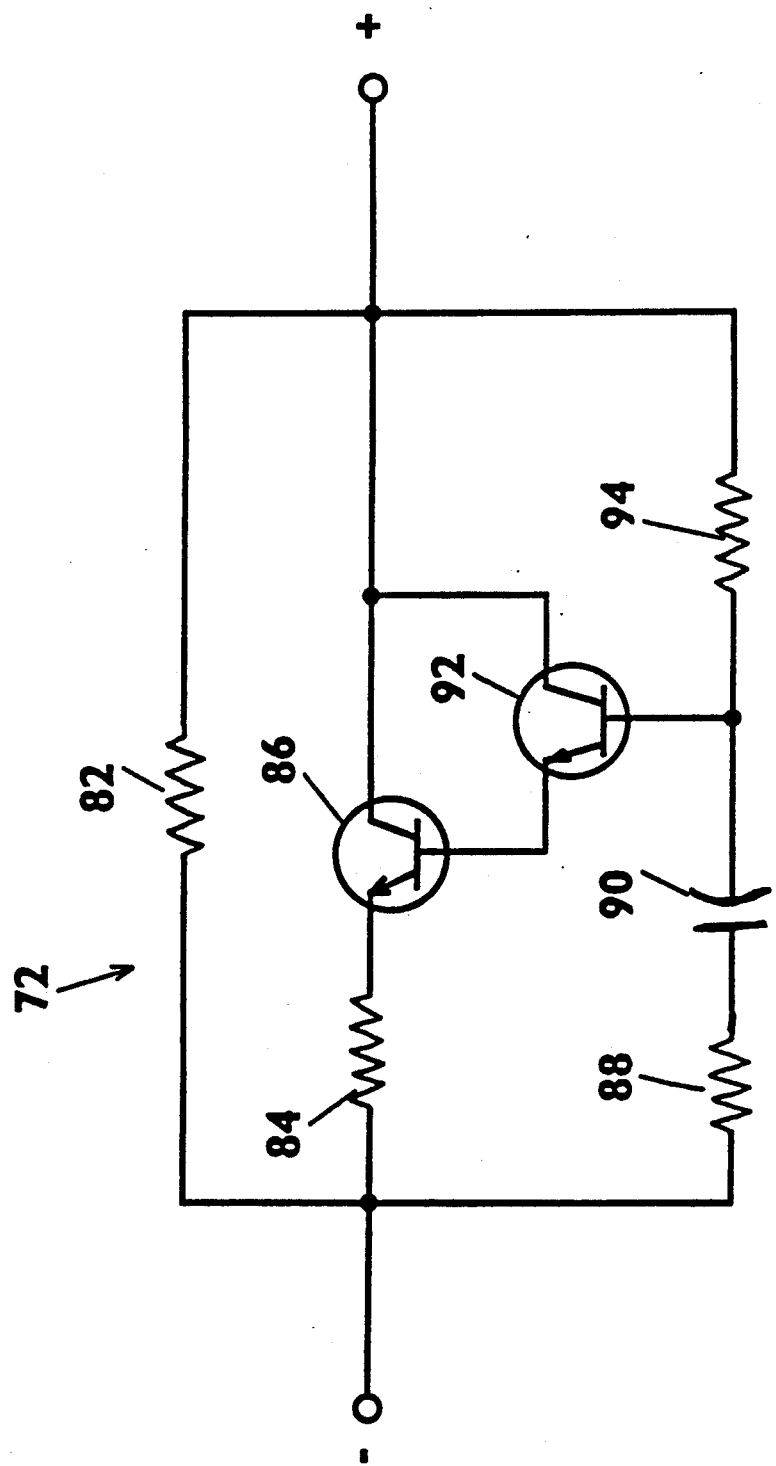
FIG. 3 is a schematic diagram of an active load in accordance with the present invention.

FIG. 3 shows a preferred embodiment of active load 72. Resistor 82 electrically couples current from the positive (+) terminal of active load 72 to the negative (−) terminal of load 72. Resistor 84 electrically couples the negative (−) terminal of load 72 to the emitter of NPN transistor 86. Resistor 88 and capacitor 90 electrically couple the negative (−) terminal of load 72 to the base of NPN transistor 92. Resistor 94 electrically couples the base of NPN transistor 92 to the positive (+) terminal of load 72. The base of NPN transistor 86 is electrically coupled to the emitter of NPN transistor 92 while the collectors of NPN transistors 86 and 92 are electrically coupled to the positive (+) terminal of load 72.

Resistor 94 provides base current to transistor 92 so that it conducts. Transistor 92, in turn, provides base current to transistor 86 so that it conducts and has a low impedance output. Transistors 86 and 92 are connected in a Darlington transistor arrangement to provide high beta or gain. Resistor 84 develops a potential drop when current flows, and the resulting potential drop enables energy storage in capacitor 90, and also stabilizes the operating point of transistors 86 and 92. Resistor 82 stabilizes the impedances of load 72 at AC frequencies and flattens the impedance (FIG. 4) at high AC frequencies. At the higher frequencies, current flows through capacitor 90 to reduce the drive current to the base of transistor 92. Resistor 88 provides intrinsic safety protection and limits the current flow from capacitor 90 if a fault occurs.

Figure 4:
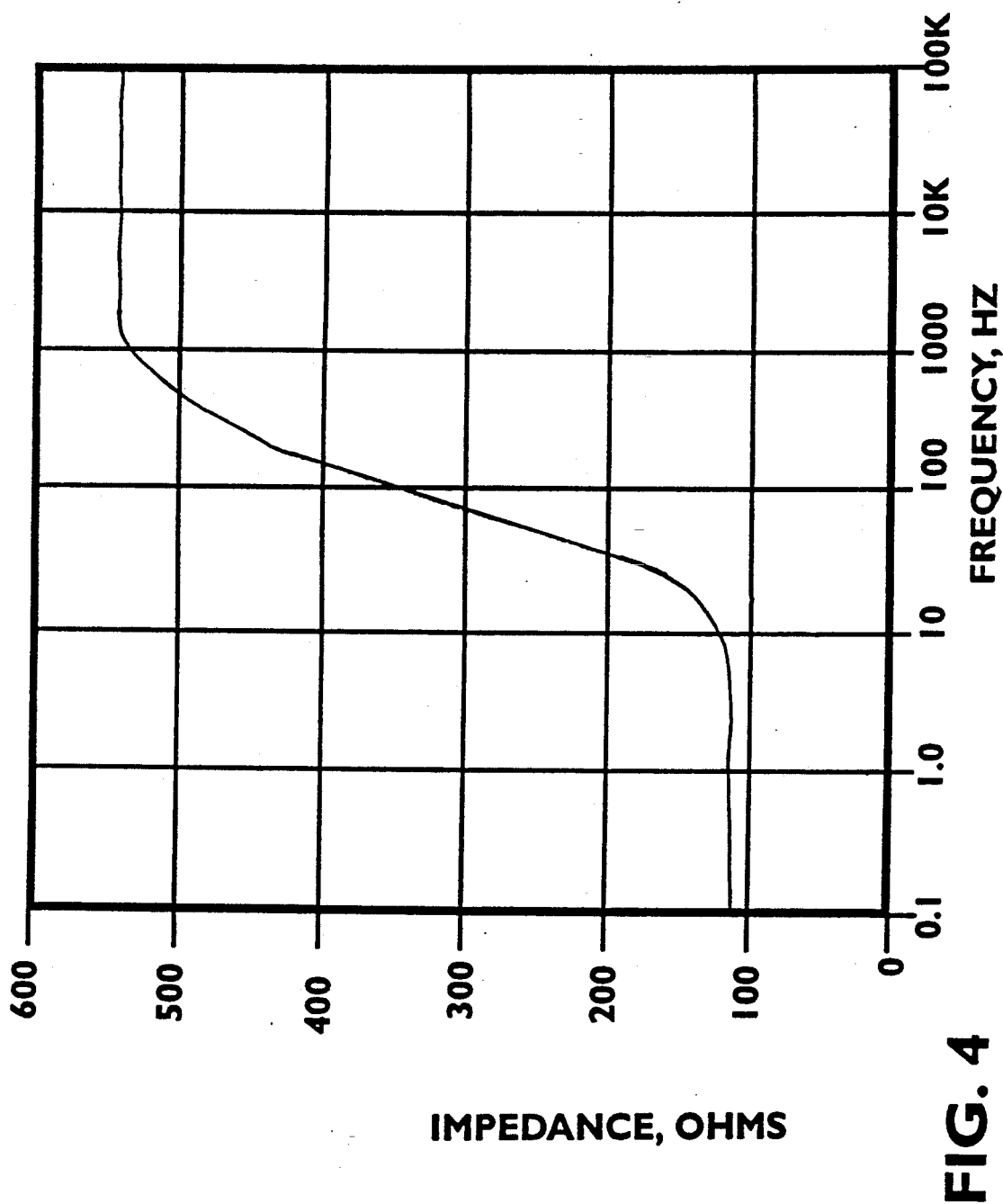
FIG. 4 is a graph depicting the AC impedance of the active load as a function of frequency in accordance with the present invention.

FIG. 4 shows the AC impedance of active load 72 as a function of frequency. At the normal operating frequency range of 1.2 kilohertz to 2.2 kilohertz, active load 72 has a constant impedance of approximately 540 ohms. This high AC impedance allows HIU 16 to properly detect digital communication signals from the transmitters connected between its positive (+) input conductor 38 and its negative (−) input conductor 40.

Figure 5:
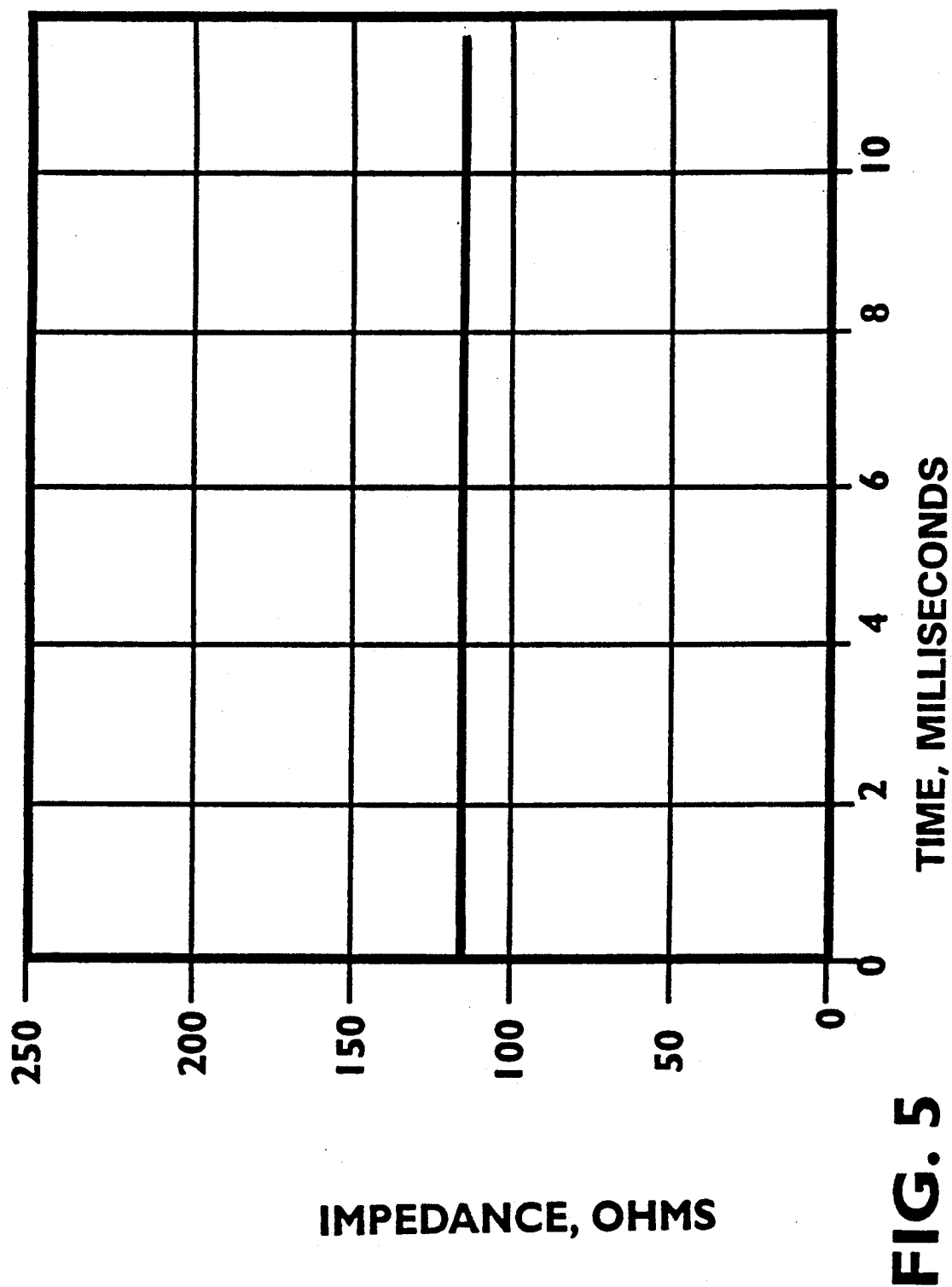
FIG. 5 is a graph depicting the DC impedance of the active load as a function of time in accordance with the present invention.

FIG. 5 shows the DC impedance of active load 72 as a function of time. As can be seen from FIG. 5, the DC impedance of active load 72 is a constant value; approximately 115 ohms. This minimal load DC impedance makes intrinsic safety approval possible, while also increasing the number of HIUs that can be powered from a given power supply. It also increases the length of wire that can run between HIU and its power supply without excessive voltage drop.

The improved HIU of the present invention is capable of detecting digital communication signals from a series of transmitters connected in parallel between its positive (+) input terminal and its negative (−) input terminal, while at the same time meeting intrinsic safety voltage and current limits.

Although the present invention has been described with reference to preferred embodiments, workers skilled in the art will recognize that changes may be made in form and detail without departing from the spirit and scope of the invention.

What is claimed is:

1. An interface unit for transmitting signals to and receiving signals from a plurality of transmitters, the interface unit comprising:
   first and second terminals for connection to the transmitters;
   transmit/receive circuit means connected to the first terminal for transmitting signals to and receiving signals from the transmitters;
   DC power supply means; and
   an active load connected in series with the DC power supply means between the first and second terminals, the active load having a first impedance at DC and a second, higher impedance within a frequency range defined by frequencies of the signals transmitted to and received from the transmitters.

2. The interface unit of claim 1 wherein the active load comprises:
   a first load terminal;
   a second load terminal;

transistor means having a first main current carrying electrode connected to the first load terminal, a second main current carrying electrode connected to the second load terminal, and a control electrode;

first resistance means connected between the second load terminal and the control electrode; and capacitance means connected between the control electrode and the first load terminal.

3. The interface unit of claim 2 wherein the active load further comprises:

second resistance means connected in series with the capacitance means between the control electrode and the first load terminal.

4. The interface unit of claim 3 wherein the active load further comprises:

third resistance means connected between the first main current carrying electrode and the first load terminal.

5. The interface unit of claim 4 wherein the active load further comprises:

fourth resistance means connected between the first and second load terminals.

6. The interface unit of claim 5 wherein the transistor means comprises:

a pair of transistors forming a Darlington transistor arrangement.

7. The interface unit of claim 2 wherein the active load further comprises:

second resistance means connected between the first main current carrying electrode and the first load terminal.

8. The interface unit of claim 2 wherein active load further comprises:

second resistance means connected between the first and second load terminals.

9. The interface unit of claim 2 wherein the transistor means comprises:

a pair of transistors forming a Darlington transistor arrangement.

10. The interface unit of claim 1 wherein the first impedance is less than about 150 ohms.

11. The interface unit of claim 1 wherein the second impedance is greater than about 500 ohms.

12. The interface unit of claim 1 wherein the frequency range is between about 1.2 kilohertz and about 2.2 kilohertz.

* * * * *